United States Patent
Kim et al.

(10) Patent No.: US 8,704,755 B2
(45) Date of Patent: Apr. 22, 2014

(54) ELECTROPHORETIC DISPLAY

(75) Inventors: Ji-Sun Kim, Seoul (KR); Seong-Young Lee, Anyang-si (KR)

(73) Assignee: Samsung Display Co., Ltd. (KR)

( * ) Notice: Subject to any disclaimer, the term of this patent is extended or adjusted under 35 U.S.C. 154(b) by 384 days.

(21) Appl. No.: 13/042,982

(22) Filed: Mar. 8, 2011

(65) Prior Publication Data
US 2012/0044229 A1    Feb. 23, 2012

(30) Foreign Application Priority Data
Aug. 17, 2010   (KR) .......................... 10-2010-0079490

(51) Int. Cl.
G09G 3/34     (2006.01)
G06F 3/038    (2013.01)
G09G 5/00     (2006.01)

(52) U.S. Cl.
USPC .............................. 345/107; 345/211; 345/84

(58) Field of Classification Search
USPC .............. 345/211, 107, 84; 359/296; 524/474
See application file for complete search history.

(56) References Cited

U.S. PATENT DOCUMENTS

| 2008/0158143 A1* | 7/2008 | Kim et al. | 345/107 |
| 2008/0239459 A1* | 10/2008 | Kang et al. | 359/296 |
| 2011/0279442 A1* | 11/2011 | Hage et al. | 345/214 |

* cited by examiner

*Primary Examiner* — Jonathan Horner
(74) *Attorney, Agent, or Firm* — Cantor Colburn LLP (57) ABSTRACT

An electrophoretic display includes a display area where images are displayed, and an edge area around the display area and where a single color is displayed. The display area includes a plurality of display pixels which include gate lines on a first substrate, data lines intersecting the gate lines, thin film transistors connected to the gate lines and data lines, display pixel electrodes on the first substrate and connected to the thin film transistors, a common electrode on a second substrate and facing the first substrate, and an electronic ink layer between the display pixel electrodes and the common electrode The edge area includes a plurality of edge pixels which include edge pixel electrodes in a same shape as the display pixel electrodes.

17 Claims, 5 Drawing Sheets

ELECTROPHORETIC DISPLAY

This application claims priority to Korean Patent Application No. 10-2010-0079490 filed on Aug. 17, 2010, and all the benefits accruing therefrom under 35 U.S.C. §119, the entire contents of which are incorporated herein by reference.

BACKGROUND OF THE INVENTION (1) Field of the Invention

The invention relates to an electrophoretic display.

(2) Description of the Related Art

An electrophoretic displays ("EPD") is a kind of flat panel display that is used in electronic books, and various types of electrophoretic displays ("EPDs") have been proposed.

Among those, an electronic ink type electrophoretic display includes two display panels having electric field generation electrodes, and electronic ink formed between the two display panels. The electronic ink contains both a plurality of black or white positive charged particles, and a plurality of black or white negative charged particles, in a microcapsule. The electrophoretic display displays images by moving the white and black charged particles from the electronic ink to electrodes having opposite polarities, respectively, and reflecting external light, by using potential difference at ends of the electrodes due to voltage applied to opposite electrodes.

The electrophoretic display has high reflectivity and contrast ratio and substantially does not depends on the viewing angle, unlike the liquid crystal display ("LCD"), such that the electrophoretic display is able to display images with comfortable feeling for the user, such as if the user was viewing the images in a non-electronic format, like paper. Further, the electrophoretic display consumes less power because it is able to maintain the images even if voltage is not continuously applied, due to the bi-stable characteristics of white and black.

Unlike a liquid crystal display, in order to represent a texture similar to paper, the electrophoretic display has an edge area in which white or black is displayed, and which is a peripheral part of a display area in which actual images are displayed.

In a conventional electrophoretic display, the edge area has edge pixel electrodes continuously formed without being divided in pixel units, which causes a problem in which the edge area is displayed brighter than the display area when a white gray level is displayed.

BRIEF SUMMARY OF THE INVENTION

The invention has been made in an effort to provide an electrophoretic display having advantages of improved visibility of an edge area.

An exemplary embodiment provides an electrophoretic display including a display area where images are displayed, and an edge area which is around the display area and where a single color is displayed. In the electrophoretic display, the display area includes a plurality of display pixels, the display pixels include gate lines on a substrate, data lines intersecting the gate lines, thin film transistors connected to the gate lines and data lines, display pixel electrodes connected to the thin film transistors, an electronic ink layer positioned on the display pixel electrodes, and a common electrode positioned on the electronic ink layer. The edge area includes a plurality of edge pixels, and the edge pixels include edge pixel electrodes in a same shape as the display pixel electrodes.

In an exemplary embodiment, the reflectance of the display pixel electrodes and the reflectance of the edge pixel electrodes may be the same.

In an exemplary embodiment, the display pixel electrodes and the edge pixel electrodes may include a same material.

In an exemplary embodiment, the electrophoretic display may further include an edge pixel connecting unit connecting adjacent edge pixel electrodes to each other.

In an exemplary embodiment, the edge pixel electrodes and the edge pixel connecting unit may include a same material.

In an exemplary embodiment, an interval between adjacent display pixel electrodes and an interval between the adjacent edge pixel electrodes may be the same.

In an exemplary embodiment, the electrophoretic display may further include an edge drive unit applying a driving signal regarding a white or black gray level to the edge pixel electrodes.

In an exemplary embodiment, the electrophoretic display may further include an edge signal line transmitting the driving signal regarding the white or black gray level from the edge drive unit to the edge pixel electrodes.

In an exemplary embodiment, the edge signal line may be positioned outside the edge area.

In an exemplary embodiment, an interval between adjacent display pixel electrodes and an interval between adjacent edge pixel electrodes may be the same.

In an exemplary embodiment, the electrophoretic display may further include an edge drive unit applying a driving signal regarding a white or black gray level to the edge pixel electrodes.

In an exemplary embodiment, the electrophoretic display may further include an edge signal line transmitting the driving signal regarding the white or black gray level from the edge drive unit to the edge pixel electrodes.

In an exemplary embodiment, the edge signal line may be positioned outside the edge area.

In an exemplary embodiment, the edge pixels may further include a gate insulating layer on the substrate, and a passivation layer between the gate insulating layer and the edge pixel electrodes.

According to the exemplary embodiments of the invention, it is possible to make reflectance of the display area and reflectance of the edge area be the same by the edge pixel electrode having the same shape as the display pixel electrode.

Therefore, brightness of the display area and brightness of the edge area become same, and thus the display area and the edge area are not distinguished when images are displayed, which makes it possible to improve visibility of the electrophoretic display.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

The invention will be described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. As those skilled in the art would realize, the described embodiments may be modified in various different ways, all without departing from the spirit or scope of the invention.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

An exemplary embodiment of an electrophoretic display, according to the invention will now be described in detail with reference to the accompanying drawings.

Figure 1:
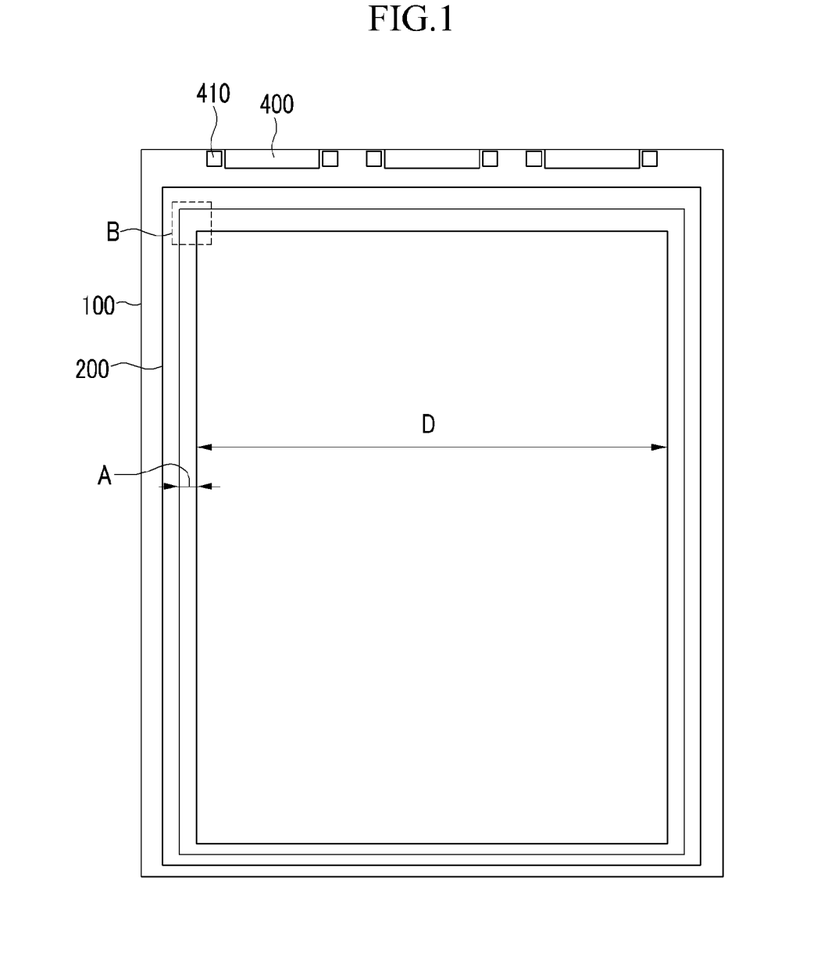
FIG. 1 is a plan view of an exemplary embodiment of an electrophoretic display, according to the invention.
Figure 2:
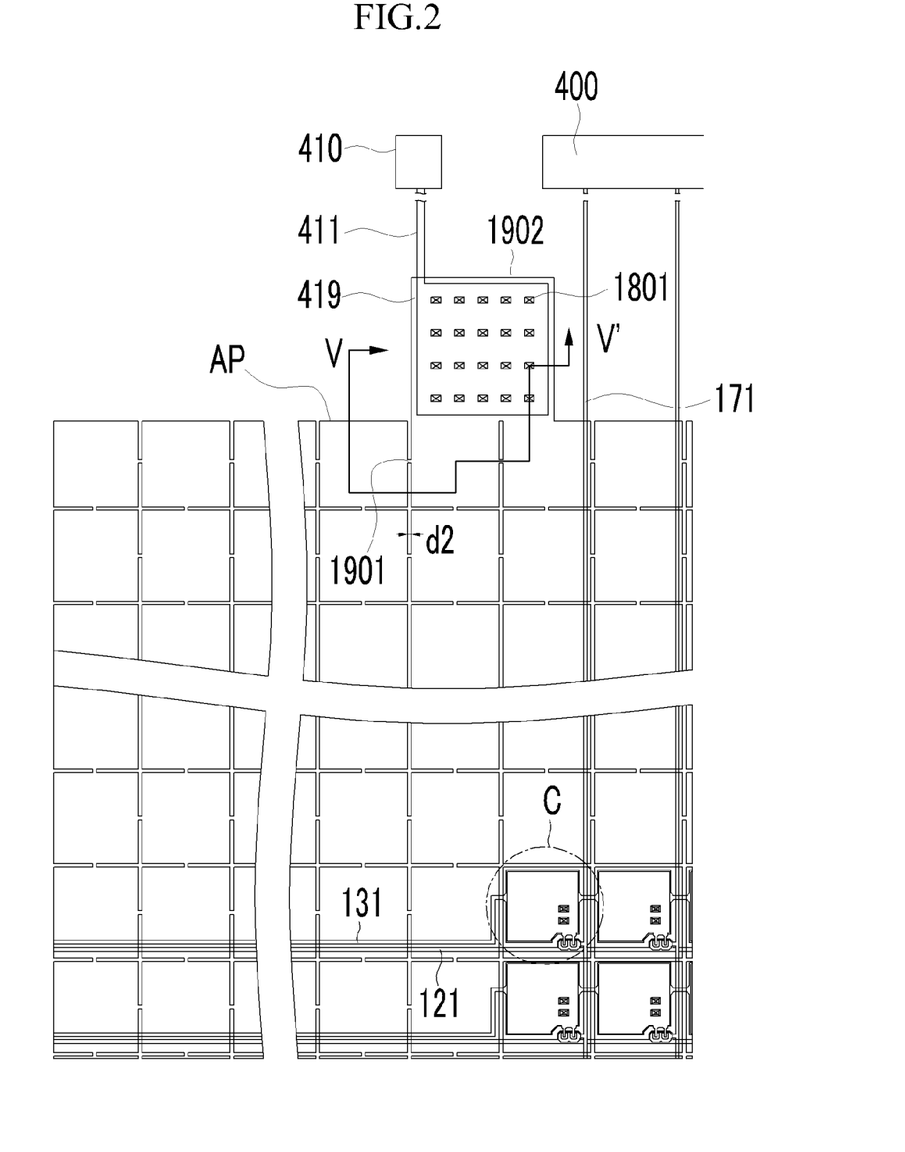
FIG. 2 is an enlarged plan view illustrating portion 'B' of FIG. 1.
Figure 3:
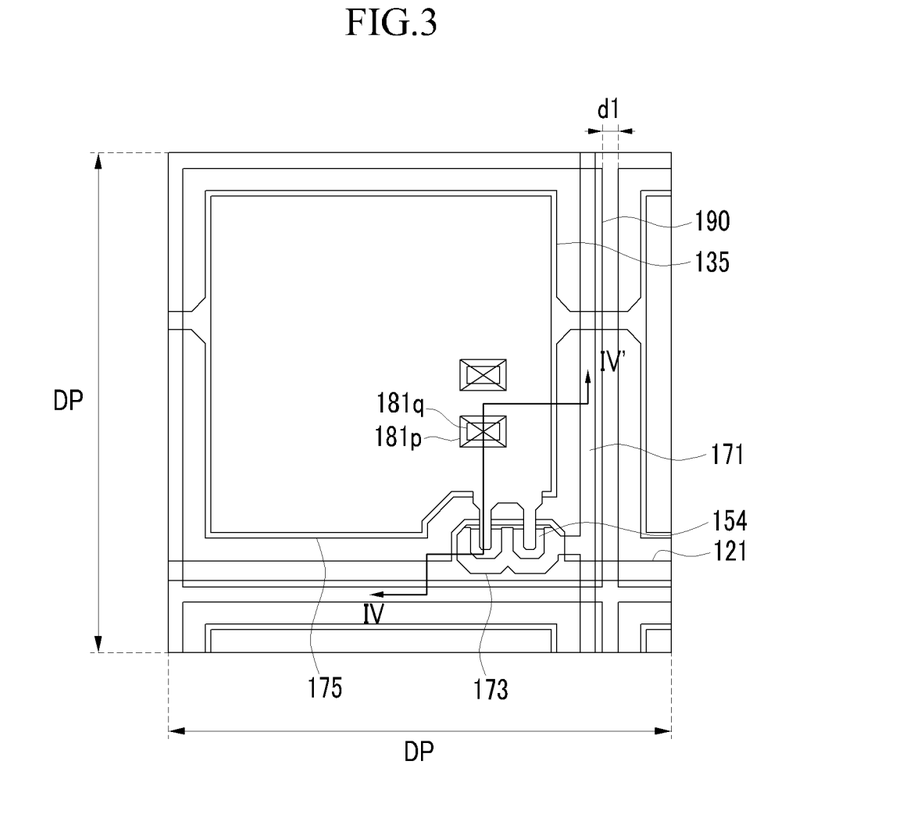
FIG. 3 is an enlarged plan view illustrating portion 'C' of FIG. 2.
Figure 4:
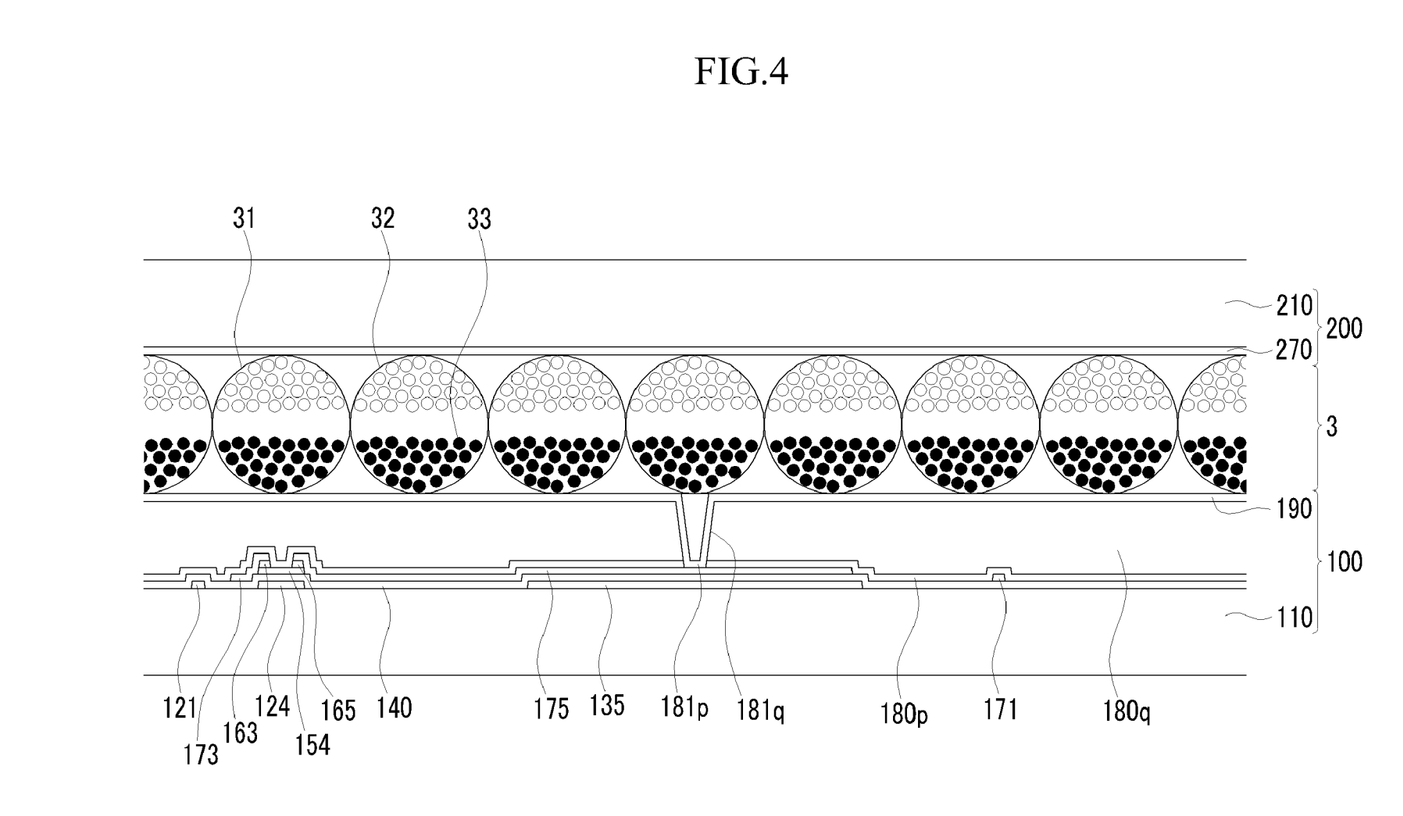
FIG. 4 is a cross-sectional view taken along line IV-IV' of FIG. 3.
Figure 5:
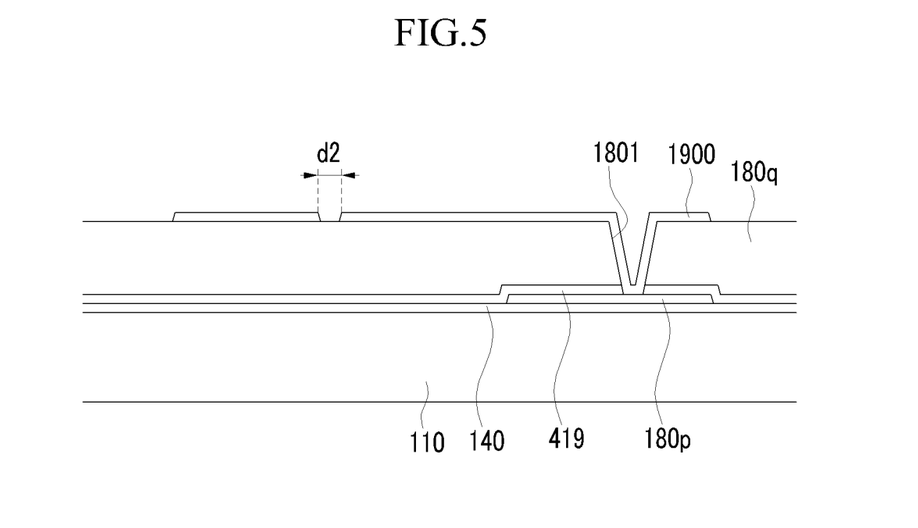
FIG. 5 is a cross-sectional view taken along line V-V' of FIG. 2.

FIG. 1 is a plan view of an exemplary embodiment of an electrophoretic display, according to the invention, FIG. 2 is an enlarged plan view illustrating portion 'B' of FIG. 1, FIG. 3 is an enlarged plan view illustrating portion 'C' of FIG. 2, FIG. 4 is a cross-sectional view taken along line IV-IV' of FIG. 3, and FIG. 5 is a cross-sectional view taken along line V-V' of FIG. 2.

As shown in FIG. 1 and FIG. 4, the exemplary embodiment of an electrophoretic display according to the present includes a lower display panel 100, an upper display panel 200 and an electronic ink layer 3. The lower display panel 100 includes a lower insulation substrate 110 and a plurality of a display pixel electrode 190 thereon. The upper display panel 200 includes an upper insulation substrate 210 facing the lower display panel 100, and a common electrode 270 thereon. Then electronic ink layer 3 is disposed between the lower display panel 100 and the upper display panel 200, and includes a plurality of a discrete electronic ink capsule 31. Each electronic ink capsule 31 is micro-sized, and includes a plurality of white positively-charged particles 32 and a plurality of black negatively-charged particles 33.

Further, on the lower display panel 100, a plurality of a drive unit 400 is disposed to apply driving signals to the display pixel electrodes 190 and the common electrode 270.

The electrophoretic display includes a display area D where images are displayed, and an edge area A which is around an entire of an outer boundary of the display area D and where a single color is displayed. The edge area A is an area for relatively improving visibility of the display area D where actual images are displayed, by displaying a single color, e.g., white or black, in an electrophoretic display without a separate black matrix of the electrophoretic display.

In a portion of the lower display panel 100 adjacent to the drive units 400, an edge drive unit 410 is disposed to apply a driving signal separate from the drive units 400. The edge drive unit 410 applies a driving signal regarding a white or black gray level to the edge area A. The drive unit 410 may be directly adjacent to the drive unit 400, and be at opposing ends of the drive unit 400.

A specific configuration of a display area D of the exemplary embodiment of an electrophoretic display according to the invention will be described below in detail with reference to FIGS. 2 to 4.

As shown in FIG. 2 to FIG. 4, in a display area D of the exemplary embodiment of an electrophoretic display according to the invention, a plurality of a display pixel DP is disposed. The configuration of each display pixel DP will be described below in detail.

The display pixels DP include gate lines 121 and storage electrode lines 131 on the lower insulation substrate 110. The lower insulation substrate 110 may include, for example, transparent glass or plastic. In one exemplary embodiment, a display pixel DP is defined as an independent area capable of independently controlling image display, for example, as corresponding to the pixel electrode 190. As used herein, "corresponding" indicates related substantially in shape, dimension and/or positional placement relative to another element.

The gate lines 121 transmit gate signals and generally extend in a first direction, e.g., a transverse direction. The gate lines 121 include a gate electrode 124 or a plurality of the gate electrode 124 protruding upward from a main portion of the gate line 121 and in a second direction, e.g., a longitudinal direction. The gate line 121 including the gate electrodes 124 is a single unitary indivisible member, as shown in FIGS. 2 and 3.

The storage electrode lines 131 transmit a predetermined voltage such as a common voltage, and generally extend in the transverse direction. The storage electrode lines 131 include storage electrodes 135 occupying most of the display pixels. That is, a planar area of an individual storage electrode 136 overlaps a majority of the planar area of an individual display pixel DP, as illustrated in FIG. 3. In an exemplary embodiment, a display pixel DP corresponds to a display pixel electrode 190.

On the gate lines 121 and the storage electrode lines 131, a gate insulating layer 140 is disposed contacting the gate lines 121 and the storage electrode lines 131. The gate insulating layer 140 may include, for example, silicon nitride (SiNx) or silicon oxide (SiOx).

On the gate insulating layer 140, semiconductors 154 are disposed contacting the gate insulating layer 140. The semiconductors 154 may include, for example, hydrogenated amorphous silicon (amorphous silicon is shortly called as a-Si) or polysilicon. The semiconductors 154 are positioned on the gate electrodes 124, such that the semiconductors overlap the gate electrodes 124 in the plan view.

On the semiconductors 154, ohmic contacts 163 and 165 are disposed contacting the semiconductors 154. The ohmic contacts 163 and 165 may include n+ hydrogenated amorphous silicon doped with an n-type impurity such as phosphorous at high concentration, or silicide. The ohmic contacts 163 and 165 make pairs which are disposed on the semiconductors 154. The ohmic contact 163 opposes the ohmic contact 165 with respect to a semiconductor 154 and the gate electrode 124.

On the ohmic contacts 163 and 165 and the gate insulating layer 140, a plurality of a data line 171, a plurality of a drain electrode 175, and a plurality of a source electrode 173 are disposed contacting portions of the ohmic contacts 163 and 165, the gate insulating layer 140 and the semiconductors 154.

The data lines 171 transmit data signals and generally extend in the longitudinal direction to intersect the gate lines 121. The data lines 171 include source electrodes 173 extending toward the gate electrodes 124. The data line 171 including the source electrode 173 is a single unitary indivisible member, as shown in FIGS. 2 and 3. The drain electrodes 175 overlap the storage electrodes 135 to form storage capacitors.

The gate electrodes 124, the source electrodes 173, and the drain electrodes 175 form thin film transistors ("TFT") together with the semiconductors 154. Channels of the thin film transistors overlap the semiconductors 154 in an area between the source electrodes 173 and the drain electrodes 175. In the channel area, a portion of the semiconductors 154 is exposed.

On the data lines 171, the drain electrodes 175, and exposed parts of the semiconductors 154, an interlayer insulating layer 180p including an inorganic insulator such as silicon nitride or silicon oxide, is disposed directly on and contacting the data lines 171, the drain electrodes, the exposed parts of the semiconductors 154, portions of the drain electrode 175, portions of the source electrode 173, and portions of the ohmic contacts 163 and 165. The interlayer insulating layer 180p protects the exposed parts of the semiconductors 154.

On the interlayer insulating layer 180p, a passivation layer 180q is disposed contacting the interlayer insulating layer 180p. The passivation layer 180q may include, for example, an organic insulator and may have a substantially flat surface.

Extending through a thickness of the interlayer insulating layer 180p and the passivation layer 180q, contact holes 181p and 181q expose the drain electrodes 175. On the passivation layer 180q, display pixel electrodes 190 are disposed contacting the passivation layer 180q. The display pixel electrodes 190 may include a transparent conductive material such as indium tin oxide ("ITO") or indium zinc oxide ("IZO"), or a reflective metal such as aluminum, silver, chromium, or an alloy thereof.

The display pixel electrodes 190 are physically and electrically connected to the drain electrodes 175 and the source electrodes 173 through the contact holes 181p and 181q.

Each display pixel electrode 190 receives a data voltage from the drain electrodes 175. The display pixel electrode 190 to which the data voltage is applied creates an electric field together with the common electrode 270 of the upper display panel 200 to which a common voltage is applied, such that the plurality of white positively-charged particles 32 and the plurality of black negatively-charged particles 33 in the electronic ink capsules 31 between electrodes 191 and 270, move to electrodes having opposite polarities, respectively, thereby forming images.

That is, when a positive voltage is applied to a display pixel electrode 190, the white positively-charged particles 32 moves to an upper part of the display (e.g., nearer a viewing side) such that the white positively-charged particles 32 reflect light, whereby white is displayed, and when a negative voltage is applied to a display pixel electrode 190, the black negatively-charged particles 33 moves to the upper part of the display such that the black negatively-charged particles 33 absorb light, whereby black is displayed.

In the illustrated exemplary embodiment, each display pixel electrode 190 is separated from neighboring display pixel electrodes 190 by a predetermined interval d1. Therefore, the reflectance of each display pixel DP is determined in proportion to a planar area of each display pixel electrode 190.

Next, a specific configuration of an exemplary embodiment of the edge area of the electrophoretic display, according to the invention will be described in detail with reference to FIGS. 2 and 5.

As shown in FIGS. 2 and 5, in the edge area A (FIG. 1) of the electrophoretic display, a plurality of an edge pixel AP is defined. A configuration of each edge pixel AP will be described below in detail.

As shown in FIGS. 2 and 5, the edge pixels AP include the gate insulating layer 140 on the lower insulation substrate 110 which includes, for example, transparent glass or plastic. On the gate insulating layer 140, the interlayer insulating layer 180*p* is disposed, and on the interlayer insulating layer 180*p*, the passivation layer 180*q* is disposed.

Directly on the passivation layer 180*q*, a plurality of an edge pixel electrode 1900 is disposed. The edge pixel electrodes 1900 include the same material as the display pixel electrodes 190 of the display area D. The edge pixel electrodes 1900 have substantially a same shape as the shape of the display pixel electrodes 190 in the plan view. That is, the size and shape of the edge pixel electrodes 1900 are same as the size and shape of the display pixel electrodes 190.

In the illustrated embodiment, the configuration of the edge pixel electrodes 1900 is different from that of the display pixel electrodes 190, in that an edge pixel connecting unit 1901 is between adjacent edge pixel electrodes 1900. In contrast, the display pixel electrodes 190 in the display area D are not separate from each other. The adjacent edge pixel electrodes 1900 are directly adjacent to each other in the transverse and/or the longitudinal directions, as illustrated in FIG. 2. The edge pixel electrodes 1900 and the edge pixel connecting units 1901 between adjacent edge pixel electrodes 1900 collectively form a single unitary indivisible pixel electrode member. Where the edge pixel connecting unit 1901 is between adjacent edge pixel electrodes 1900, it is possible to make the reflectance of the edge pixel electrodes 1900 same as the reflectance of the display pixel electrodes 190.

Adjacent edge pixel electrodes 1900 are disposed at a predetermined interval d2, and the edge pixel connecting unit 1901 connecting the adjacent edge pixel electrodes 1900 is between the edge pixel electrodes 1900. The edge pixel connecting unit 1901 includes the same material as the edge pixel electrodes 1900. The edge pixel connecting unit 1901 has a function of transmitting a driving signal regarding a white or black gray level applied from the edge drive unit 410, to all edge pixel electrodes 1900.

The interval d2 between the plurality of edge pixel electrodes 1900 in the edge area A of the display, may be same as the interval d1 between the plurality of display pixel electrodes 190 in the display area D of the display. Where the interval d2 between the plurality of edge pixel electrodes 1900 in the edge area A of the display is the same as the interval d1 between the plurality of display pixel electrodes 190 in the display area D, it is possible to make the reflectance of the edge pixel electrodes 1900 same as the reflectance of the display pixel electrodes 190.

An edge signal line 411 extending from the edge drive unit 410 includes an edge drive protrusion part 419 overlapping a protrusion part 1902 of the edge pixel electrodes 1900, e.g., the single unitary indivisible pixel electrode member. The edge signal line 411 and the edge drive protrusion part 419 collectively form a single unitary indivisible member. Since the edge drive protrusion part 419 is on the gate insulating layer 140, edge contact holes 1801 are extended completely through a thickness of the interlayer insulating layer 180*p* and the passivation layer 180*q*. The edge drive protrusion part 419 is physically and electrically connected to the protrusion part 1902 of the edge pixel electrodes 1900 via the edge contact holes 1801.

As described above, it is possible to make the reflectance of one edge pixel AP of the edge area A the same as the reflectance of one display pixel DP of the display area D, by applying the driving signal regarding the white or black gray level from the edge drive unit 410 to the edge pixel electrode 1900 having the same planar shape as the display pixel electrode 190.

Where the reflectance of one edge pixel AP of the edge area A the same as the reflectance of one display pixel DP of the display area D, brightness of the display area D and brightness of the edge area A become same, and thus the display area D and the edge area A are not distinguished when images are displayed, which makes it possible to improve visibility of the electrophoretic display.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrophoretic display comprising:
a display area in which images are displayed, and
an edge area which is around the display area and in which a single color is displayed, wherein:
the display area includes a plurality of display pixels, the display pixels include:
gate lines on a first substrate,
data lines on the first substrate and intersecting the gate lines,
thin film transistors connected to the gate lines and data lines,
display pixel electrodes on the first substrate and connected to the thin film transistors,
a common electrode on a second substrate and facing the display pixel electrodes; and
an electronic ink layer between the display pixel electrodes and the common electrode, and
the edge area includes:
a plurality of edge pixels, and
the edge pixels include edge pixel electrodes on the first substrate,
wherein
a shape of an edge pixel electrode is substantially the same as that of a display pixel electrode, in a plan view, and
an interval between adjacent display pixel electrodes and an interval between adjacent edge pixel electrodes are the same, in the plan view.

2. The electrophoretic display of claim 1, wherein:
a reflectance of the display pixel electrodes and a reflectance of the edge pixel electrodes are the same.

3. The electrophoretic display of claim 2, wherein:
the display pixel electrodes and the edge pixel electrodes include a same material.

4. The electrophoretic display of claim 3, further comprising:
an edge pixel connecting unit on the first substrate and connecting the adjacent edge pixel electrodes to each other.

5. The electrophoretic display of claim 4, wherein:
the edge pixel electrodes and the edge pixel connecting unit include a same material.

6. The electrophoretic display of claim 5, further comprising:
an edge drive unit on the first substrate, wherein the edge drive unit applies a driving signal regarding a white or black gray level to the edge pixel electrodes.

7. The electrophoretic display of claim 6, further comprising:
an edge signal line on the first substrate, wherein the edge signal line transmits the driving signal regarding the white or black gray level from the edge drive unit, to the edge pixel electrodes.

8. The electrophoretic display of claim 7, wherein:
the edge signal line is outside the edge area.

9. The electrophoretic display of claim 2, further comprising:
   an edge drive unit on the first substrate, wherein the edge drive unit applies a driving signal regarding a white or black gray level to the edge pixel electrodes.

10. The electrophoretic display of claim 9, further comprising:
   an edge signal line on the first substrate, wherein the edge signal line transmits the driving signal regarding the white or black gray level from the edge drive unit, to the edge pixel electrodes.

11. The electrophoretic display of claim 10, wherein:
   the edge signal line is outside the edge area.

12. The electrophoretic display of claim 2, wherein:
   the edge pixels further include a gate insulating layer on the first substrate, and a passivation layer between the gate insulating layer and the edge pixel electrodes.

13. The electrophoretic display of claim 12, wherein:
   the display pixel electrodes and the edge pixel electrodes include a same material.

14. The electrophoretic display of claim 13, further comprising:
   an edge pixel connecting unit on the first substrate and connecting the adjacent edge pixel electrodes to each other.

15. The electrophoretic display of claim 14, wherein:
   the edge pixel electrodes and the edge pixel connecting unit include a same material.

16. The electrophoretic display of claim 15, further comprising:
   an edge drive unit on the first substrate, wherein the edge drive unit applies a driving signal regarding a white or black gray level to the edge pixel electrodes.

17. The electrophoretic display of claim 16, further comprising:
   an edge signal line on the first substrate, wherein the edge signal line transmits the driving signal regarding the white or black gray level from the edge drive unit, to the edge pixel electrodes.

* * * * *